July 3, 1928.   W. M. FLEMING   1,676,179

VALVE

Filed April 30, 1927

W. M. Fleming.
INVENTOR

BY
ATTORNEY

Patented July 3, 1928.

1,676,179

UNITED STATES PATENT OFFICE.

WILLS M. FLEMING, OF HOLYOKE, MASSACHUSETTS, ASSIGNOR TO WORTHINGTON PUMP AND MACHINERY CORPORATION, OF NEW YORK, N. Y., A CORPORATION OF VIRGINIA.

VALVE.

Application filed April 30, 1927. Serial No. 187,755.

This invention relates to valves and more particularly to valves designed for use in displacement pumps of the type employed for handling hot liquids such as oil during its circulation in the distillery.

An object of the present invention is to provide a valve structure, which is designed in such manner that all of the parts may be equally and easily taken apart for cleaning, one which embodies a minimum number of pressure joints, and one in which all of the parts are yieldably and firmly held in position under expansion and contraction due to great and frequent temperature variances to which the valve is subjected.

With this object in view, the invention consists in various features of construction and combination of parts, which will be first described in connection with the accompanying drawings, showing a valve of the preferred form embodying the invention, and the features forming the invention will be specifically pointed out in the claims.

In the drawings—

Figure 1:
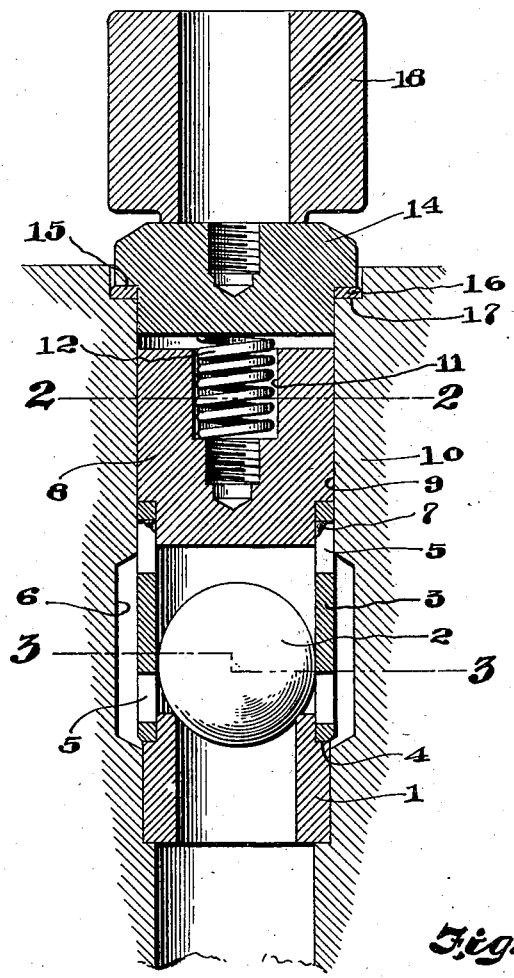
Figure 1 is a longitudinal section through the improved valve.
Figure 2:
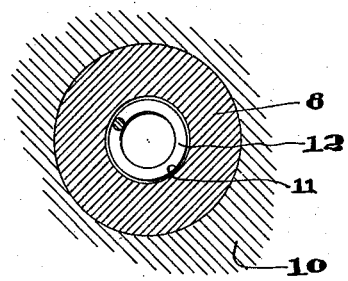
Figure 2 is a cross section on the line 2—2 of Figure 1.
Figure 3:
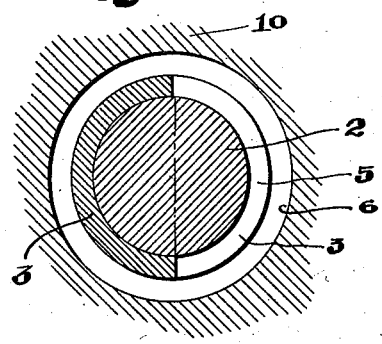
Figure 3 is a cross section on the line 3—3 of Figure 1.
Figure 4:
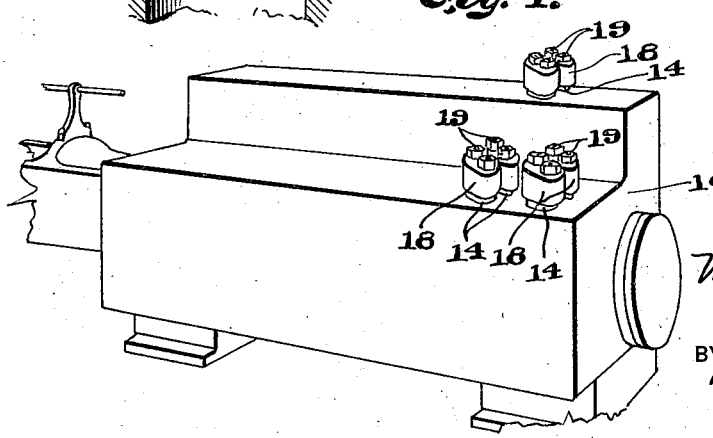
Figure 4 is a fragmentary perspective view of a pump of the type with which the valves are used.

Referring more particularly to the drawings, the improved valve structure comprises a valve seat 1 upon which a ball valve 2 rests. A valve cage 3 is provided, in which the ball valve 2 moves and which, at its lower end abuts a shoulder 4 formed on the seat 1. The cage 3 is provided with suitable openings 5 having communication with passageways 6 and its upper end is welded or otherwise suitably attached, as shown at 7 to the pressure member 8 which fits within the bore 9 of the pump housing 10. The pressure member 8 is provided with a recess 11 in which a spring 12 is seated and it also has a threaded bore 13 which is adapted to receive an eye bolt or the like to facilitate the removal of the pressure member 8 and cage 3 from within the opening or bore 9. A second or outer pressure member 14 is provided which extends into the bore 9 and engages the upper end of the spring 12 for forming a stop for the spring. The upper pressure member 14 has an annular shoulder 15 thereon which engages against a gasket 16 that rests upon a shoulder 18 formed on the pump housing 10. The gasket 16 is of any suitable type, preferably an aluminum gasket filled with asbestos or other non-inflamable material.

The upper pressure member 4 is forced tightly in engagement with the gasket 16 and in the bore 9 by a clamp 18 which is attached to the pump housing 10 by bolts 19 so as to securely clamp the pressure member 14 in position to provide a fluid tight pressure joint and to permit ready removal of the clamp 18 and pressure members 14 and 8 and the remaining parts of the valve for the purpose of cleaning.

The spring 12 provides yieldable means for maintaining the seat 1 firmly and tightly in its position and also maintaining the cage 3 in tight fitting engagement with the shoulders 4 under expansion and contraction of these members due to great and frequent variances in the temperature to which the valve structure is subjected, especially in installations where the pump is employed for pumping hot oil or analogous hot fluid.

The cage 3, valve seat 1, ball valve 2 and the spring 12 are all constructed of a special stainless steel so as to permit efficient operation of the pump during the handling of oil or other fluid under extremely high temperatures.

From the foregoing description and the drawings it will be noted that the pressure member 8, cage 3 and valve seat 1 are arranged in such manner that the spring 12 will exert yieldable pressure from one of these members through the other to maintain tight pressure joints at all times.

It will be understood that the invention is not to be limited to the specific construction or arrangement of parts shown but that these may be modified widely within the invention defined by the claims.

What is claimed is:

1. In a valve mechanism, a combination with a carrying body, of a valve seat, a valve cage, a pressure member engaging said cage, the fluid passages in said valve mechanism being confined to said body, valve seat and valve cage, whereby no fluid will pass through said pressure member, said valve cage having only frictional engagement with said valve seat and said valve seat, cage and pressure member having only frictional engagement with said body, whereby said seat and cage and said seat, cage and pressure member will be free to move under expansion and contraction.

2. In a valve mechanism, a combination with a carrying body, of a valve seat, a valve cage, a pressure member engaging said cage, the fluid passages in said valve mechanism being confined to said body, valve seat and valve cage, whereby no fluid will pass through said pressure member, said valve cage having only frictional engagement with said valve seat and said valve seat, cage and pressure member having only frictional engagement with said body, whereby said seat and cage and said seat, cage and pressure member will be free to move under expansion and contraction, a second pressure member carried by said body, and a spring between the said first and second pressure members to maintain said seat, cage and first pressure member tightly in position.

3. In a valve mechanism, the combination with a carrying body, of a valve seat, a valve cage, a pressure member engaging said cage, a second pressure member carried by said body, a spring between said first and second pressure members, the said valve cage having only frictional engagement with said valve seat and said valve seat, cage and first and second pressure members having only frictional engagement with said body, whereby they will be free to move under expansion and contraction.

In testimony whereof I affix my signature.

WILLS M. FLEMING.